US012602838B2

(12) United States Patent
Cohen-Tidhar et al.

(10) Patent No.: US 12,602,838 B2
(45) Date of Patent: Apr. 14, 2026

(54) SYSTEM, DEVICE, AND METHOD FOR IMPROVED IMAGE ENCODING THAT NON-ITERATIVELY TARGETS AND ACHIEVES A VISUAL-QUALITY THRESHOLD AND A COMPRESSION EFFICIENCY THRESHOLD

(71) Applicant: CLOUDINARY LTD., Petah Tikva (IL)

(72) Inventors: Amnon Cohen-Tidhar, Kadima-Zoran (IL); Elad Ben Baruck, Kiryat Gat (IL); Yaron Vaxman, Ganei Tikva (IL); Jon Philippe D. Sneyers, Asse (BE); Tal Lev-Ami, Modiin (IL)

(73) Assignee: CLOUDINARY LTD., Petah Tikva (IL)

( * ) Notice: Subject to any disclaimer, the term of this patent is extended or adjusted under 35 U.S.C. 154(b) by 346 days.

(21) Appl. No.: 18/420,802

(22) Filed: Jan. 24, 2024

(65) Prior Publication Data

US 2025/0238963 A1     Jul. 24, 2025

(51) Int. Cl.
*G06T 9/00* (2006.01)
*G06T 3/4046* (2024.01)

(52) U.S. Cl.
CPC ............ *G06T 9/002* (2013.01); *G06T 3/4046* (2013.01)

(58) Field of Classification Search
CPC .............................. G06T 9/002; G06T 3/4046
See application file for complete search history.

(56) References Cited

U.S. PATENT DOCUMENTS

| | | | |
|---|---|---|---|
| 2023/0007284 A1* | 1/2023 | Li | H04N 19/11 |
| 2023/0102895 A1* | 3/2023 | Kim | G06T 9/00 382/275 |
| 2023/0146390 A1* | 5/2023 | Sadaka | G06T 7/0002 345/611 |
| 2025/0016350 A1* | 1/2025 | Bae | H04N 19/11 |

* cited by examiner

*Primary Examiner* — Juan M Guillermety

(74) *Attorney, Agent, or Firm* — AlphaPatent Associates Ltd.; Daniel J. Swirsky

(57) ABSTRACT

System, device, and method for improved image encoding that non-iteratively targets and achieves a visual-quality threshold and a compression efficiency threshold. A system receives an input image intended for compression; and applies a pre-trained Convolutional Neural Network (CNN) Engine to predict what would be (i) compression ratio values and (ii) visual-quality score values, for a resulting compressed image that would be encoded or transcoded from said input image, if said input image would be compressed via a particular Image Encoder from a pool of available Image Encoders by using a particular Encoder Settings from a pool of Image Encoder Settings. Based on CNN-based predictions generated by the pre-trained CNN Engine, the system selects a single combination of Image Encoder with Encoder Setting, and performs a single compression of said input image using said single combination of Image Encoder with Encoder Setting to generate an optimally compressed image.

24 Claims, 5 Drawing Sheets

300

SYSTEM, DEVICE, AND METHOD FOR IMPROVED IMAGE ENCODING THAT NON-ITERATIVELY TARGETS AND ACHIEVES A VISUAL-QUALITY THRESHOLD AND A COMPRESSION EFFICIENCY THRESHOLD

FIELD

Some embodiments are related to the field of image encoding.

BACKGROUND

Electronic devices and computing devices are utilized on a daily basis by millions of users worldwide. For example, laptop computers, desktop computers, smartphone, tablets, and other electronic devices are utilized for browsing the Internet, consuming digital content, streaming audio and video, sending and receiving electronic mail (email) messages, engaging in Instant Messaging (IM) and video conferences, playing games, or the like. Digital images and digital videos are often sent and received among users, are posted or shared by users via social networks, and are part of content shown on a variety of websites.

SUMMARY

Some embodiments include systems, devices, and methods for improved image encoding that non-iteratively targets and achieves a target visual-quality level and/or a target compression ratio and/or a target byte-size and/or a target Bits Per Pixel (BPP) value.

Some embodiments non-iteratively encode or compress an input image into a destination image or a resulting image, by using a single encoding iteration or a single encoding pass that directly generates a resulting image having at least a particular level or score or metric of visual quality or perceived visual quality; and/or that has at most a particular maximum byte-size or BPP value.

Some embodiments are configured to operate in accordance with an innovative process that does not generate multiple interim compressed versions of the input image, each compressed version generated by a different encoding scheme and/or using different encoding parameters; and in a process that does not need to then select a particular compressed version out of such plurality of interim, differently-encoded, compressed versions. Rather, some embodiments perform a single process of image encoding or image compression on the input image, that generates exactly and only one resulting compressed image, that is estimated or is predicted—based on an Artificial Intelligence (AI) engine and particularly a Convolutional Neural Network (CNN) engine—to have at least a target visual-quality score, and/or to have at most a target byte-size, and/or to have at most a target BPP value, as required or as defined by a user or by the system.

For example, a system receives an input image intended for compression; and applies a pre-trained Convolutional Neural Network (CNN) Engine to predict what would be (i) compression ratio values and (ii) visual-quality score values, for a resulting image that would be encoded or transcoded from said input image, if said input image would be compressed via a particular Image Encoder from a pool of available Image Encoders by using a particular Encoder Settings from a pool of Image Encoder Settings. Based on CNN-based predictions generated by the pre-trained CNN Engine, the system selects a single combination of Image Encoder with Encoder Setting, and performs a single compression of said input image using said single combination of Image Encoder with Encoder Setting to generate an optimally compressed image.

Some embodiments may provide other and/or additional benefits and/or advantages.

DETAILED DESCRIPTION OF SOME DEMONSTRATIVE EMBODIMENTS

The Applicant has realized that lossy encoding of images has a tradeoff between (i) the level of compression used, and (ii) the level of visual quality of the resulting encoded imaging. On the one hand, a system administrator or a user wishes to compress the image to a small byte size, to save on storage space and to expedite its delivery speed over communication networks. On the other hand, the system administrator or the user does not wish to harm or to adversely affect the visual quality of the image beyond an acceptable level for the specific application needs.

The Applicant has realized that every image has its own unique properties or characteristics; such as, level of details, brightness, contrast, sharpness, the type and size of the object in focus of the object-of-interest, the specific geometric patterns and textures contained within the image, the image resolution (e.g., in pixels), the image dimensions or their ratio (e.g., rectangular 16:9 image, rectangular 4:3 image, square image), the color depth (e.g., 8-bit or 16-bit or 24-bit color depth), or the like.

The Applicant has realized that agnostically applying the same compression settings/parameters to different source images, typically results in considerable different levels of visual quality of the resulting/encoded images. Additionally or alternatively, realized the Applicant, different image encoding methods or codecs produce different types of visual artifacts, such as blur, noise, blocks, aliasing, color spill, or other visual imperfections.

The Applicant has realized that the above may lead to non-desired or sub-optimal results. For example, some compressed images suffer from poor and even unacceptable visual quality; whereas other compressed images have good visual quality but are unnecessarily bloated in byte size and thus waste storage space and communication network bandwidth.

Figure 1:
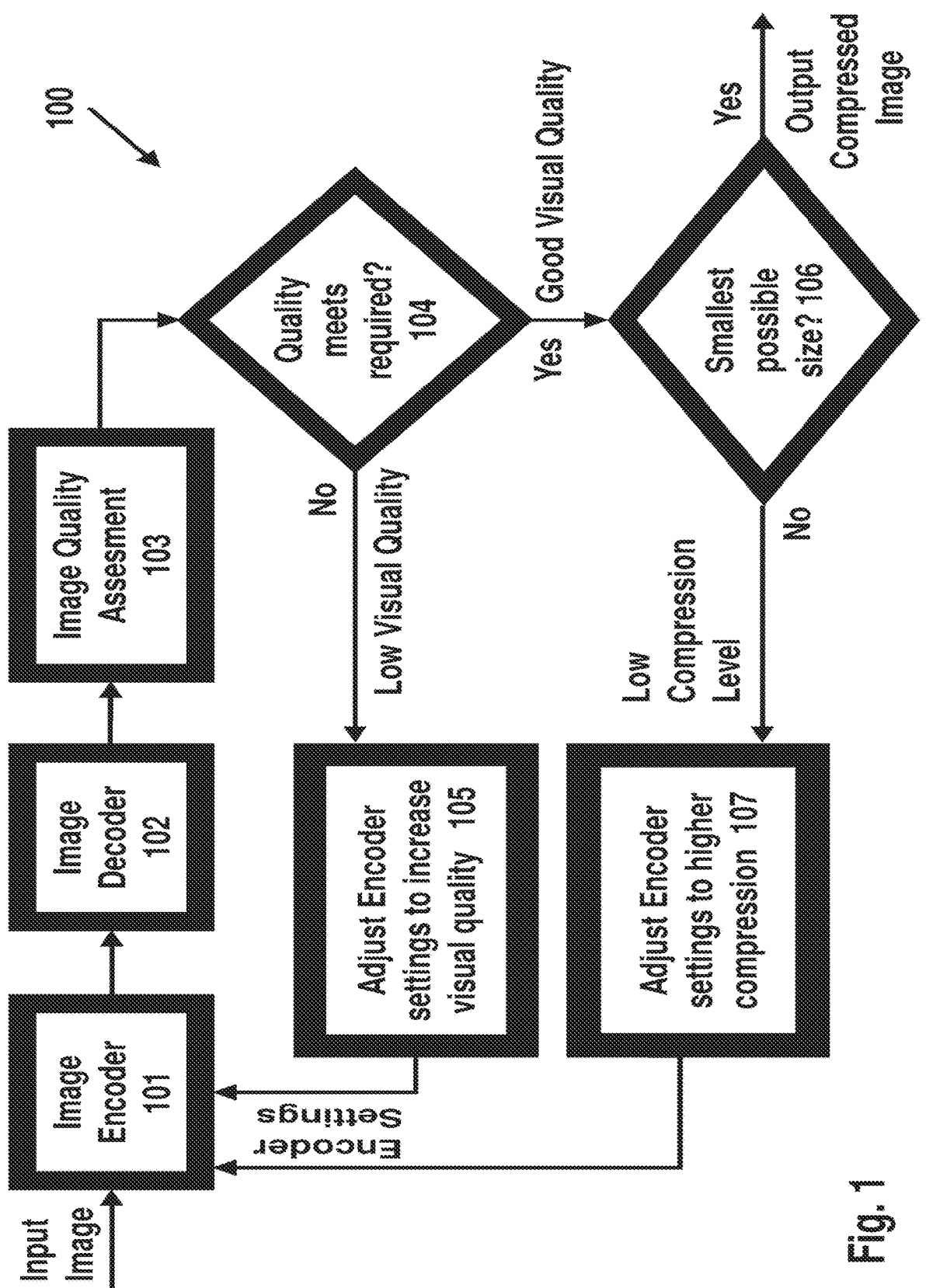
FIG. 1 is a schematic block-diagram illustration of a flow for iteratively generating a compressed image having sufficient visual quality and highest possible compression.

Reference is made to FIG. 1, which is a schematic block-diagram illustration of a flow 100 for iteratively generating a compressed image having sufficient visual quality and highest possible compression. The flow of FIG. 1 may be utilized in some embodiments; although some other embodiments may generate improved or enhanced results by using a non-iterative process.

As demonstrated in FIG. 1, the flow is operable to obtain an image having a desired level of visual quality in an iterative compression method. An input image is encoded by an Encoder Unit 101 with a set of encoder settings or encoder parameters. The encoded image is then decoded by a Decoder Unit 103, and is tested (e.g., by a comparator unit or other image comparison unit or Image Quality Assessment Unit 103) for its visual quality; such as, by searching for artifacts, noise, inaccuracies, differences, or other anomalies or imperfections. The flow checks whether the estimated visual quality of the encoded version of the input image, meets or exceeds a pre-defined image quality threshold value (block 104). If the estimated quality of the encoded image falls below the required threshold (arrow "No" from block 104), namely, the encoded image has low visual quality, then the Encoder settings are adjusted (block 105) to increase the visual quality (e.g., by reducing the compression ratio), and the flow continues iteratively to perform another iteration of image encoding, image decoding, visual quality assessment, and so forth. The amplitude of the adjustment can be a function of the differences between the estimated quality and the required threshold; for example, based on a pre-defined formula or lookup table. For example, a demonstrative implementation may define that if the difference between the estimated quality and the required threshold is greater than N percent (such as, greater than 10 percent), then the next iterative step would change the encoder settings according to a first modification scheme (e.g., change the JPEG level from 80 to 90); whereas, if the difference between the estimated quality and the required threshold is not greater than N percent, then the next iterative step would change the encoder setting according to second modification scheme that is more fine-tuned (e.g., change a JPEG level from 80 to 81). Other suitable stepped modification schemes may be used, to accommodate the difference between the estimated quality and the required threshold.

In contrast, if the estimated visual quality of the encoded image meets or exceeds the required level or threshold value, then an opposite iterative process is performed: increasing the compression ratio (e.g., applying a more aggressive compression), and re-testing the encoded image. The flow checks (block 106) whether the smallest possible size was achieved (e.g., by checking whether a slightly smaller file size, such as 1 percent or 2 percent or 3 percent smaller byte-size was already tested and failed to meet the required quality threshold); and if not, and the visual quality is still sufficient, then the Encoder settings are adjusted to apply a higher compression ratio (block 107) and the flow continues iteratively to perform another iteration of image encoding, image decoding, visual quality assessment, and so forth.

This iterative flow continues until (A) a compressed version of the input image meets the required visual quality level, and also (B) a more compressed version of the input image does not meet the required visual quality level; as the compressed version of condition (A) is the smallest (in byte size) compressed image that still provides the desired visual quality level.

The Applicant has realized that the flow of FIG. 1, which may eventually generate a desired compressed image, may sometimes be costly to implement (e.g., may require excessive processing resources and/or processing time) and/or may be slow to generate the target compressed image, and/or may require an excess number of encoding and decoding and assessment iterations. This can particularly problematic when applied to image encoders that are costly or slow even for a single image encoding step, as is the case for some of the modern image codecs. The Applicant has innovatively realized that the flow of FIG. 1 may be modified or even entirely replaced by improved flows and improved methods, that may yield the target compressed image in a non-iterative process, which may be faster and/or more cost effective (e.g., may require fewer computing resources or less processing time or less processing cycles or less processing operations, or less encoding operations).

Figure 2:
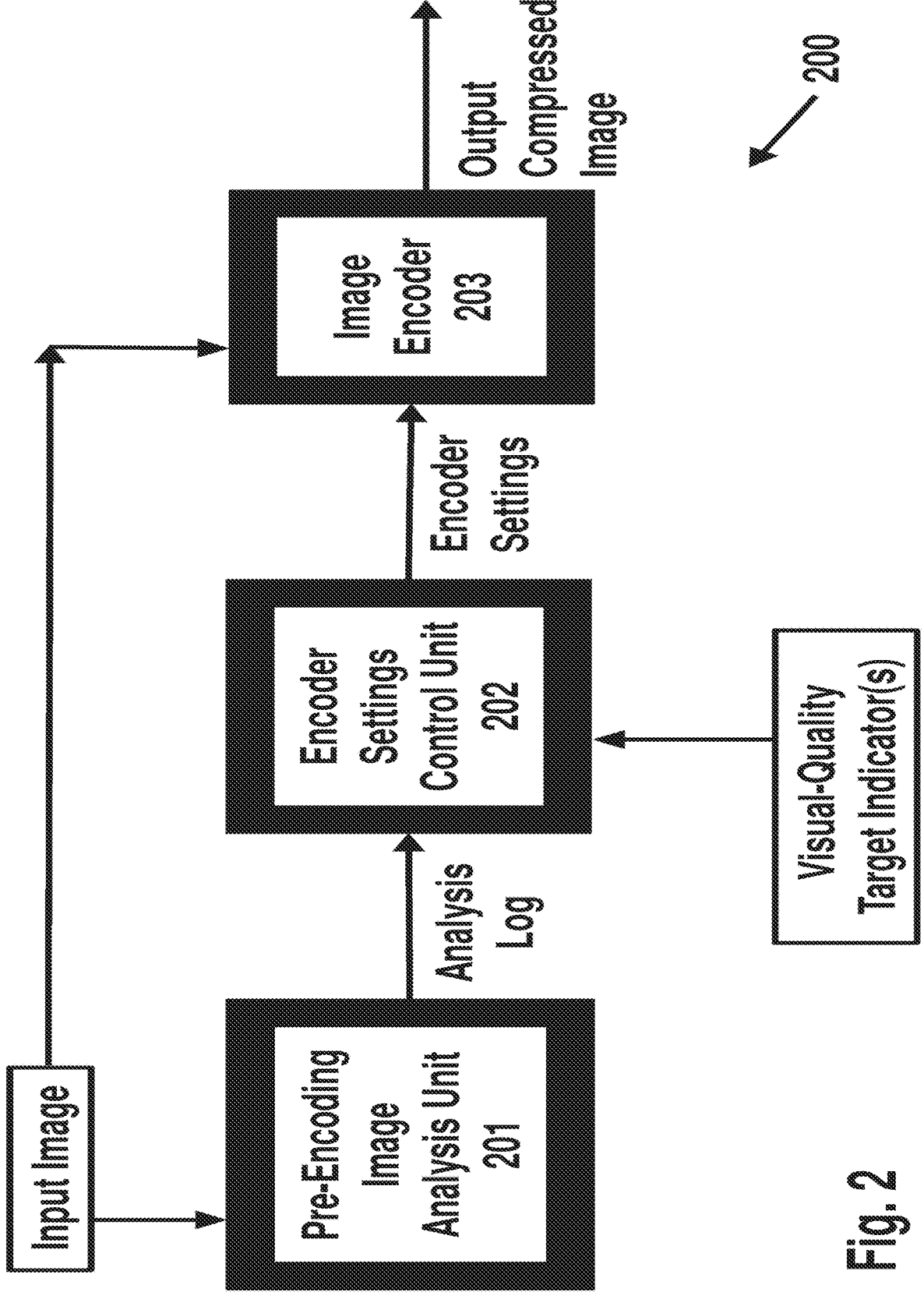
FIG. 2 is a schematic block-diagram illustration of a flow of a non-iterative image compression process, that receives an input image and is configured to generate a compressed image therefrom, in accordance with some demonstrative embodiments.

Reference is made to FIG. 2, which is a schematic block-diagram illustration of a flow 200 of a non-iterative image compression process, that receives an input image and is configured to generate a compressed image therefrom, in accordance with some demonstrative embodiments. The generated compressed image is more likely to meet or exceed a visual-quality threshold that is provided for that particular input image; and the compression ratio is the best possible for this particular image using this particular compression scheme while also meeting the visual-quality threshold. In some embodiments, the compression ratio can be measured by Bits-Per-Pixel (BPP), such that a lower BPP indicates better compression ratio. In other embodiments, the compression ratio may be measured by a percentage of reduction of byte-size relative to an original/reference image; for example, a compression that reduces the byte-size of an original image by 70 percent (e.g., an original image of 1,000 kilobyte becomes a 300-kilobyte compressed image), is a "better" compression relative to a compression that reduces the byte-size of that same original image by 60 percent (e.g., that same original image of 1,000 kilobyte becomes a 400-kilobyte compressed image).

The system and method of some embodiments are configured to analyze an input image; to estimate or predict the visual-quality levels and the compression ratios that are expected from a set of possible image-compression processes and parameters; and to then automatically select or determine or set the best encoder parameters to generate the compressed image, in a single run or a single encoding iteration, ensuring that the compressed image immediately meets or exceeds the required/the target visual-quality level or threshold. This is performed by utilizing a single non-iterative image analysis, and particularly by using an image analysis process that utilizes an Artificial Intelligence (AI)/Machine Learning (ML)/Deep Learning (DL)/Neural Network (NN) analysis or engine(s).

For example, an AI/ML/DL/NN based Pre-Encoding Image Analysis Unit 201 receives an input unit, performs the AI/ML/DL/NN based image analysis, and generates an Analysis Log or other analysis results; which are transferred to an Encoder Settings Control Unit 202.

The Encoder Settings Control Unit 202 receives the Analysis Log or other analysis results from the Pre-Encoding Image Analysis Unit 201; and also receives one or more indicators of the target (the required) visual-quality level for the compressed version of this input image. The Encoder Settings Control Unit 202 uses the image analysis log or results, and the target visual-quality indicators, and the relevant/allowed/available/authorized compression formats/techniques (e.g., JPEG, WebP, AVIF, HEIF, JPEG XL). The Encoder Settings Control Unit 202 interpolates the image analysis log/results, and selects the best encoding param- eters/encoding settings/encoding coefficients for the given input image, namely, the encoding technique and the encod- ing configuration that are predicted to generate a compressed image having the required visual-quality level at the lowest size (e.g., at the lowest byte size for the entire image; or having the smallest Bits Per Pixel (BPP) value). The selected encoding parameters/settings may include, for example: a preferred encoding library, encoding codec/format, a pre- ferred color-space down-sampling method (e.g., 4:4:4, or 4:2:0, or monochrome), the quantization/quality settings for the specific encoding library, and other encoder-specific parameters such as the bit-depth/color-depth and speed/ processing effort/CPU effort. The encoder settings are received by, and/or applied at, the relevant Image Encoder Unit 203, which also receives the input image and proceeds to encode the input image into a compressed image with the supplied encoder settings. The encoding of the input image into the compressed image is performed exactly one time, in a non-iterative manner, without generating one or more interim compressed versions or candidate compressed ver- sions, and without any decoding or decompression of any such interim compressed versions, and without performing any comparison between the input image and an interim compressed version.

In some embodiments, the Pre-Encoding Image Analysis Unit 201 utilizes a Neural Network (NN) that was pre- trained on a large dataset (e.g., thousands of images, or millions of images). The Pre-Encoding Image Analysis Unit 201 receives an uncompressed input image/source image, and performs an NN-based analysis to generate the image analysis results/log. It is noted that in some embodiments, the input image is received in an uncompressed format or in an uncompressed representation (e.g., a RAW image, a BMP image), or is received in a format that is loss-less or loss-free (e.g., a PNG image, a GIF image). In some embodiments, optionally, the input image may need to be decoded as a preliminary step; for example, decoding an input image from its loss-less PNG format into an uncompressed bitmap image. In other embodiments, the input image may be already be compressed or encoded (e.g., an input image that as a JPEG file that was encoded with encoder settings that are expected to yield high quality by that encoder); and a decoding step may be performed, prior to re-encoding that input image into another format and/or using another image compression technique and/or using other encoder settings.

Figure 3:
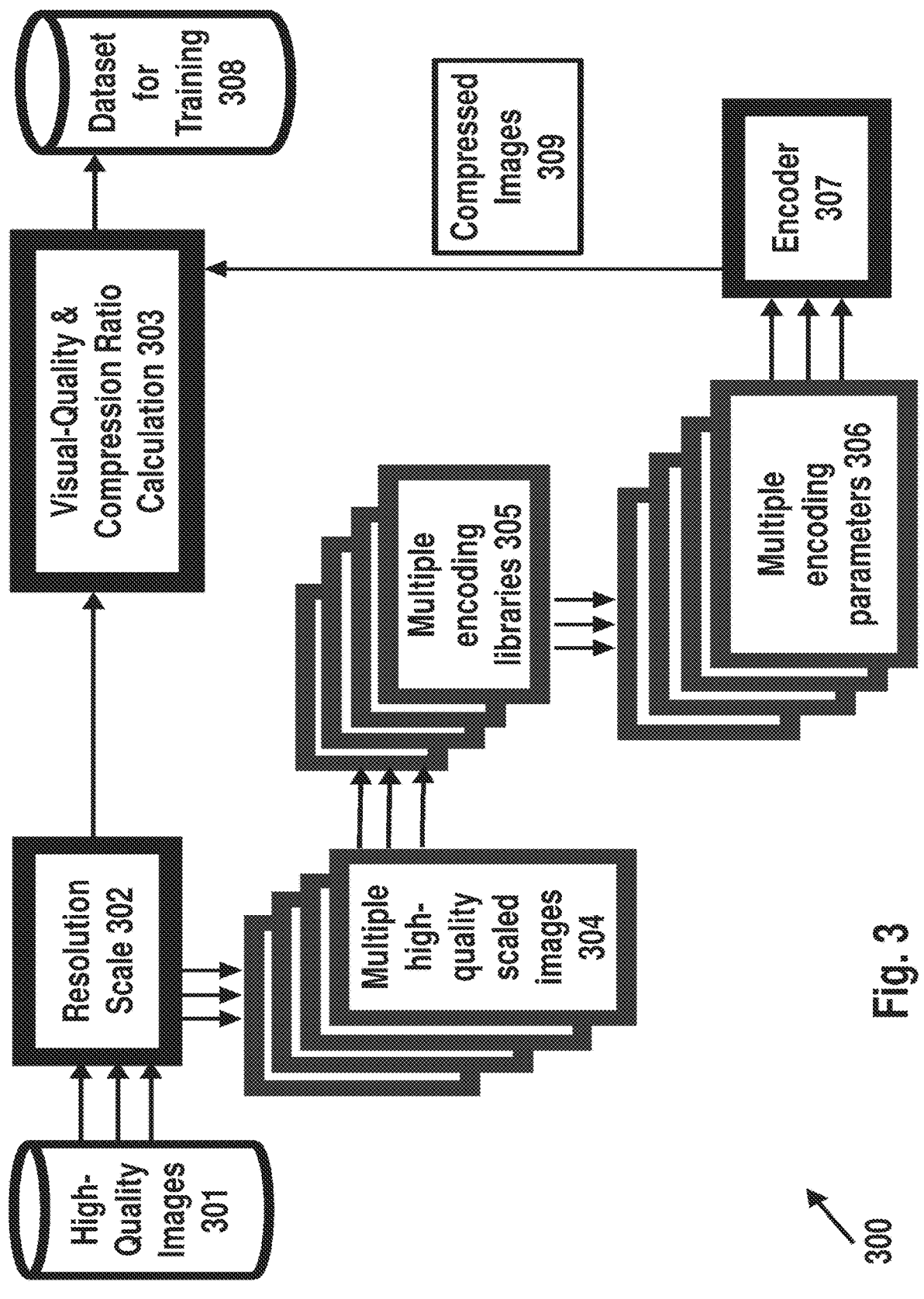
FIG. 3 is a schematic block-diagram illustration of a system for constructing a training dataset that can be used by a Neural Network based image analysis unit, in accordance with some demonstrative embodiments.

Reference is made to FIG. 3, which is a schematic block-diagram illustration of a system 300 for constructing a training dataset that can be used by such NN-based Pre-Encoding Image Analysis Unit, in accordance with some demonstrative embodiments.

For example, a large corpus of High-Quality Images 301 is provided, having thousands or tens-of-thousands or even millions of high-quality images. In some embodiments, a high-quality image has high resolution (e.g., larger than pre-defined minimum resolution; such as, larger than 1,920 by 1,080 as a non-limiting example; or having resolution of at least 10 megapixels, as a non-limiting example), and is known to have no noise (or a noise level that is known to be minimal or below a pre-defined threshold level), and is known to have no artifacts (or, artifacts that are known to be few and/or below pre-defined threshold levels of quantity and/or size). The corpus of High-Quality Images 301 includes images from multiple different domains or fields; for example, indoor images and outdoor images, nature images, images of humans and/or animals and/or objects and/or products, photographs captured at day-time or in well-lit areas, photographs captured at night-time or in poorly-lit areas, computer-generated images or computer-generated imagery (CGI) items or other synthetic images, human portraits, or the like.

A Resolution Scale Unit 302 performs a pre-processing stage and generates or provides multiple derived versions of each image contained in the corpus of High-Quality Images 301, thereby generating multiple high-quality scaled images 304. For example, a High-Quality Image that is a photo- graph taken at a 48-megapixel resolution (e.g., 8,000 by 6,000 pixels), such downscaled image versions may include 24-megapixel version, 12-megapixel version, 6-megapixel version, 3-megapixel version, 1-megapixel version, 0.5-megapixel version, 0.1-megapixel version, 0.01 megapixel (10 kilo-pixel) version.

The system further utilizes multiple different Image Encoding Libraries 305, each of them corresponding to a particular encoding format/technique/scheme and accompa- nying encoding settings/coefficients/parameters. For example, such Image Encoding Libraries 305 may include: AVIF (libaom, libwza v1), WebP (libwebp), JPEG (mozjpeg, libjpeg), JPEG XL (libjxl), HEIC or HEIF (libheif), JPEG 2000 or JP2, or the like.

For each combination of (i) an image from the high- quality images 301, and (ii) an encoding library from the multiple encoding libraries 305, the system automatically generates a plurality of compressed images 309 by using different sets of encoding parameters 306 (e.g., quantization and color-space down-sampling) per each image/library.

In order to demonstrate the order of magnitude of the data, I indicates the original number of the high-quality images 301; S indicates the number of downscaled versions per each high-quality image; L indicates the number of encoding libraries; P indicates the number of sets of encoding settings per each encoded library; and therefore, for a single high- quality image, the Encoder 307 generates $S \times L \times P$ versions of compressed images; and for the I original high-quality images, the Encoder 307 generates a total of $I \times S \times L \times P$ versions of compressed images. It can be observed that from a single high-quality image, dozens and even hundreds of compressed versions are generated automatically. For example, 6 downscaled versions of a single original high- quality image, multiplied by 5 encoding libraries, multiplied by 20 sets of encoding parameters or encoding settings per library, yields $6 \times 5 \times 20 = 600$ compressed images from that single high-quality image.

For each of the compressed images that were generated as mentioned above, the system determines or calculates a Visual-Quality Score (VQS) using one or more pre-defined or referenced based visual quality metric(s) for determining or estimating objective visual quality and/or subjective visual quality of an image; for example, by checking for and/or counting and/or finding properties of artifacts or noise or imperfection or "color bleeding", or by determining and using Peak Signal-to-Noise Ratio (PSNR) and/or Mean- Square Error (MSE) of a particular image characteristic or for a set of image characteristics, or a Structural Similarity Index (SSIM) or other perceptual metric that quantifies image degradation or image quality, such as Feature Simi- larity Indexing Method (FSIM), Video Multi-Method Assessment Fusion (VMAF), Structural SIMilarity Unveil- ing Local And Compression Related Artifacts (SSIMULA- CRA), and/or other visual-quality parameters or metrics or indicators, including AI-based/ML-based/DL-based VQS estimators. In some embodiments, a single metric is used to estimate the VQS of a compressed image. In other embodiments, a combination or a weighted combination of at least two metrics or parameters is utilized to estimate the VQS of a compressed image.

In some embodiments, at least one of the metrics or VQS parameters is calculated with regard to the entirety of the compressed image. Additionally or alternatively, in some embodiments, at least one of the metrics or VQS parameters is calculated with regard to a portion or region of the compressed image that is not the entirety of the compressed image (e.g., only the central 80 percent of the image compressed image, without borders or margins), or with regard to a region-of-interest of the compressed image (e.g., an image-portion that depicts a human or an object-of-interest, rather than mere background, based on computerized vision analysis or based on meta-data that indicates an in-image location of an object-of-interest). In some embodiments, at least one of the metrics or VQS parameters is calculated with regard to a particular characteristic of the compressed image (e.g., only color count; or only brightness level; or only contrast level; or only Red color levels; or the like); whereas, in other embodiments, at least one of the metrics or VQS parameters is calculated with regard to at least two particular yet different characteristics of the compressed image (e.g., with regard to Red and Green levels, or Red and Green and Blue levels).

The system also calculates or determines a compression ratio of each compressed image (e.g., relative to the original yet downscaled/non-encoded corresponding image), indicated in Bits Per Pixel (BPP). The VQS score and the Compression Ratio are determined by a Visual-Quality & Compression Ratio Calculation Unit 303.

The system thus generates a list or table or dataset, indicating the VQS value and the compression ratio (e.g., in BPP) for each original high-quality image; indicating the expected VQS and the expected compression ratio based on the relevant image resolution, encoding library, and encoding parameters/settings. The dataset is then used as Dataset for Training 308, in order to train the NN or other AI-based/ML-based/DL-based engine or estimator or predictor.

Figure 4:
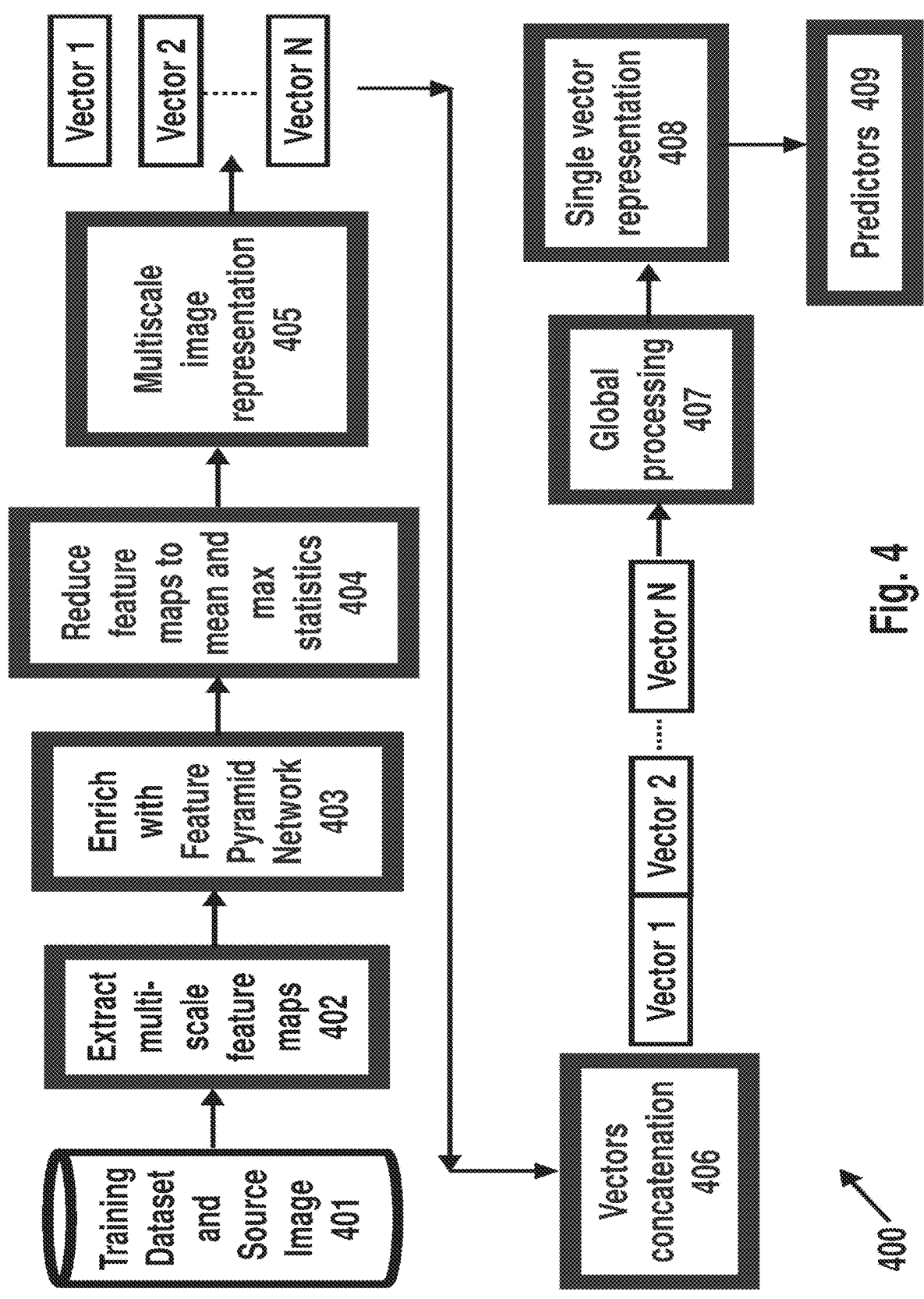
FIG. 4 is a schematic block-diagram illustration of a flow for training and/or configuring a Neural Network, in accordance some demonstrative embodiments.

Reference is made to FIG. 4, which is a schematic block-diagram illustration of a flow 400 for training and/or configuring a Neural Network (NN), in accordance with some demonstrative embodiments. For example, a multi-scale AI neural network is trained to capture both the fine and the coarse patterns of an image, in order to predict—for a given high-quality source image—what would be the resulting visual-quality score and the compression-ratio for each of the encoders or encoding libraries (e.g., particular implementations of AVIF, JPEG, WebP, HEIC, and JPEG XL) at multiple different encoder settings.

The input image is fed into a Convolutional Neural Network (CNN), such as mobilenetV3, which extracts intermediate feature maps from multiple different layers. Each layer contains a different level of information of the input image, from low level features to high level semantic features. Block 401 indicates that the input image is fed, and that the CNN is pre-trained on the training dataset that was constructed as described above; and Block 402 indicates the extraction of multi-scale feature maps.

A Feature Pyramid Network (FPN) is used (block 403) to refine and/or enrich the multiscale feature maps. The FPN allows the feature maps to share information among themselves, resulting in a more accurate pyramid representation of the input image.

Statistics processing is then performed (block 404); for example, the refined feature pyramid is then processed by a several convolutional layers, performing max and average (mean) pooling to reduce the data to 1D vectors, one vector for each of the levels in the feature pyramid, resulting in a compact representation of the image. As indicated in Block 405, a multiscale image representation is thus transformed into a plurality of vectors, denoted Vector 1, Vector 2, and so forth through Vector N.

Vector concatenation is performed (block 406), such that the set of compact representations are merged or combined into a single feature vector, by concatenating vectors into a single concatenated vector.

Global processing is performed (block 407), such that the single concatenated vector is processed by several linear layers, to enable the model to learn how to combine and transform the different information in the concatenated vector. This process is effective for capturing complex patterns and relationships in the data.

The global processed feature that resulted from the global processing, is fed as a single vector representation (Block 408) into one or more quality predictors 409. Each predictor is implemented as a small linear network, configured to predict the estimated quality that each encoder will deliver for this input image in different encoder settings.

The CNN generates as output, for example, a table or an ordered list indicating VQS values and Compression Ratio values for each of the available encoder libraries/codecs and their encoding settings.

Figure 5:
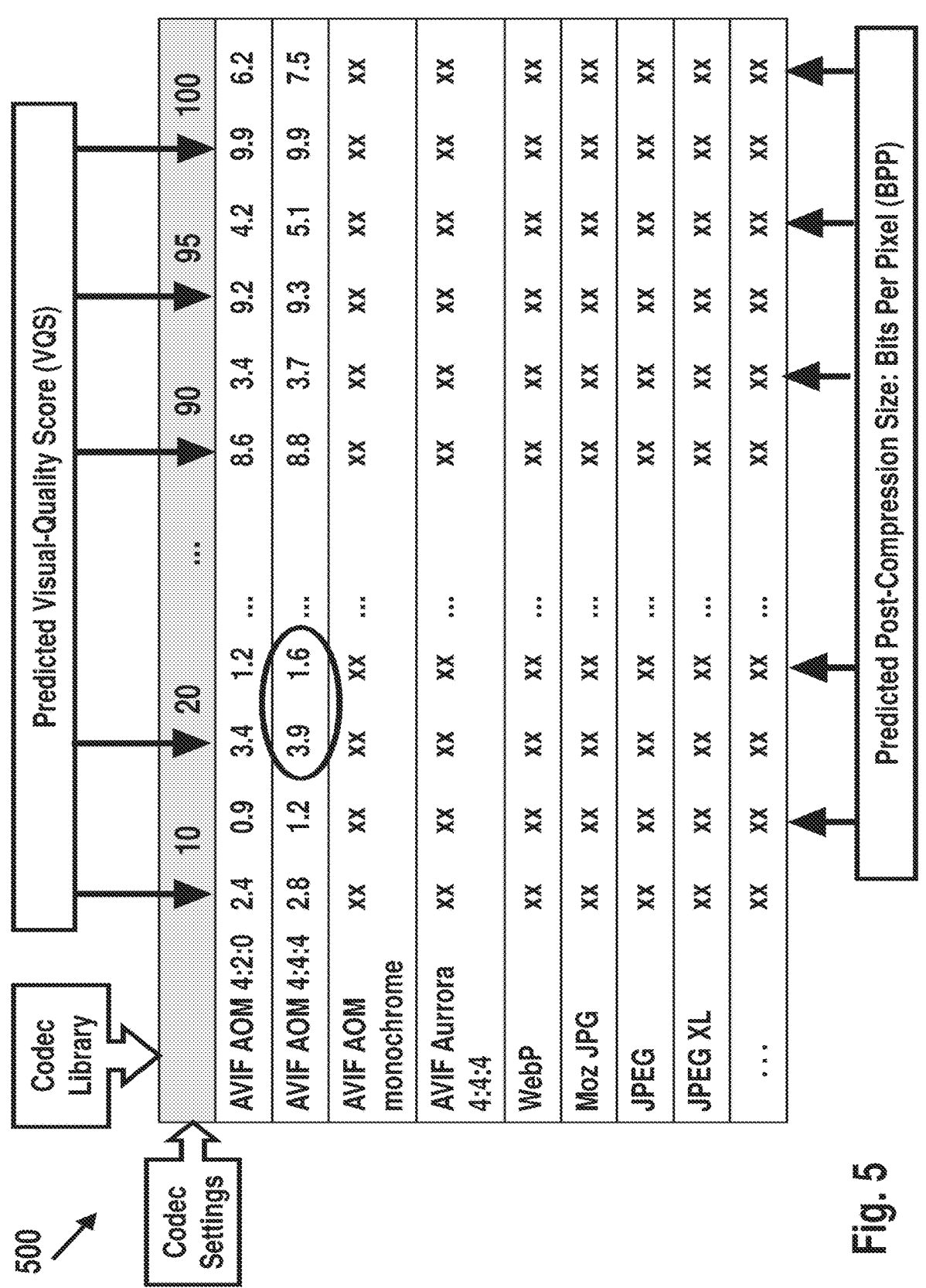
FIG. 5 is a schematic illustration of a data-structure demonstrating output generated by the Neural Network indicating predicted Visual-Quality Score values and predicted Compression Ratio (or compression efficiency) values, for each of a plurality of available encoder libraries/codecs and their encoding settings, in accordance with some demonstrative embodiments.

Reference is made to FIG. 5, which is a schematic illustration of a data-structure 500, optionally arranged as a table or dataset, demonstrating output generated by the CNN indicating predicted VQS values and predicted Compression Ratio (or compression efficiency) values for each of the available encoder libraries/codecs and their encoding settings, in accordance with some demonstrative embodiments.

The left-most column in data-structure 500 indicates the Codec Library/Encoder Library; for example, "AVIF AOM 4:2:0", or "WebP", or "JPEG", or "JPEG XL", or the like. The top row in data-structure 500 indicates the set of Codec Settings/Encoder Settings that can be used; for example, encoder setting "10", encoder setting "20", up to encoder setting "100"; the intervals can be 1 or 5 or 10 or other number, or may be uneven intervals; and it is possible that some Encoders/Codecs will have more intervals or more data-points than others. For example, a JPEG codec/encoder may have 12 data-points of settings, whereas a WebP codec may have 10 data-points of settings.

For each combination of: (i) an Encoder/Codec Library (namely, each row), intersecting with (ii) a Codec/Encoder Setting (namely, each column), there is an intersecting Pair of data-points, such that the pair that is denoted with an oval around it: the left number in the pair indicates the Predicted VQS value for that combination of Encoder/Codec Library with that Codec/Encoder Setting; and the right number in the pair indicates the Predicted Size in BPP (or, other indicator of predicted compression ratio, or predicted compression efficiency) for that combination of Encoder/Codec Library with that Codec/Encoder Setting.

In a first demonstrative embodiment, an original dataset of 1,000 high-quality images is converted into (for example) 120 downscaled and compressed versions per image, thereby providing 120,000 images; and for each of those 120,000 compressed images, the training system generates a corresponding data-structure 500 having (for example) ten rows by ten columns, or having 100 pairs of data-points; such that 12,000,000 pairs of data-points are generated from those 1,000 high-quality images. Similarly, an original data-set of 10,000 high-quality images can be used to create a dataset of 120 million pairs of data-points; and so forth, enabling the construction of a reliable dataset for training the CNN and for yielding reliable predictions of VQS and Compression Ratio with regard to a given image.

It is noted that for demonstrative purpose, some portions of the discussion may relate to Compression Efficiency or Compression Ratio as measured in Bits Per Pixel (BPP), such that a smaller value indicates better (more aggressive) compression; for example, an image version having BPP value of 3, is better compressed (more aggressively compressed) relative to another image version having BPP value of 4. However, some embodiments may utilize other metrics for Compression Efficiency, such as Compression Ratio measured in percentage values relative to an original image; for example, a compression ratio of "82 percent" is better compression (more aggressive compression" relative to a compression ratio of "94 percent". Other suitable metrics may be used to indicate or to measure Compression Ratio or Compression Efficiency.

Some embodiments provide methods and systems for non-iterative (or: single iteration) visual-quality targeting image encoding. For example, by selecting or receiving or defining a target visual-quality score (or level, or metric) that the compressed image should meet or exceed, the system analyzes the input image and automatically selects the suitable encoder/codec/library and the suitable encoder parameters (or settings), such that a single encoding iteration is performed and produces a compressed image that meets or exceeds the required visual-quality target.

Some embodiments provide methods and systems for non-iterative byte-size targeting image encoding or image compression. For example, by selecting or receiving or defining a target byte-size value or Bits Per Pixel (BPP) value for an input image, the system analyzes the input image and automatically selects and sets the relevant encoder and the encoder parameters such that a single encoding (compression) iteration is performed and produces a compressed image that meets the required/the target byte-size or BPP value; namely, such that the compressed image has byte-size or BPP value that are equal to or smaller than the target byte-size or BPP value.

Some embodiments provide methods and systems for non-iterative image encoding that is visual-quality targeting and is also maximum byte-size capping or maximum BPP capping. For example, by selecting or receiving or defining a target visual-quality score and a maximum compressed image size (in bytes, or in BPP), the system analyzes the input image and automatically sets or selects the required encoder and the encoding parameters such that a single encoding iteration directly produces a compressed image that meets or exceeds the required visual-quality score within the allowed byte-size range, or a compressed image having the highest-possible visual-quality score that is still within the required maximum byte-size or BPP value.

Some embodiments provide methods and systems for non-iterative image encoding having byte-size targeting (or BPP targeting) while ensuring a minimal visual-quality score of the compressed image. For example, by selecting or receiving or defining a target byte-size or average BPP value, as well as a minimal visual-quality score that should be achieved for a given input image, the system analyzes the input image and automatically selects and sets the required encoder and its encoding parameters such that a single encoding iteration produces a compressed image that meets the required byte-size (or BPP value) target, and that has visual-quality score that meets or exceeds the target visual-quality score; or, a compressed image having a visual-quality score that meets the minimal required (or target) level of visual-quality score even if the compressed image has a byte-size (or a BPP value) that is higher than the target byte-size (or BPP value).

In some embodiments, the system is configured to select, in a non-iterative process, in a process that uses CNN-based predictions of estimated VQS values and estimated Compression Ratio scores, between two or more chroma sub-sampling method (e.g., between 4:4:4 and 4:2:0), to produce in a single iteration and with a single encoding process, a compressed image having a required/target visual-quality score at a smaller byte-size compressed image file. In some embodiments, the system is configured to predict in advance, for a given input image, whether chroma sub-sampling method A or chroma sub-sampling method B is predicted to yield a smaller byte-size, without actually performing the two encoding operations according to each chroma sub-sampling method; and to select accordingly only one of the two chroma sub-sampling methods (A or B), and to utilize the selected chroma sub-sampling method to encode that input image.

In some embodiments, the system is configured to select the preferred codec (e.g., among JPEG or WebP or AVIF of JPEG XL, or the like) that is predicted by the CNN Engine to produce a compressed image file having the required/the target visual-quality score and predicted to have the smallest byte-size compressed image file.

Some embodiment provide methods and systems for AI-based or CNN-based image analysis that predicts the visual-quality and the compression-ratio that are expected for encoding an input image, using various combinations of image codecs and encoding settings; without actually encoding that input image with such plurality of combinations; and for selecting a particular combination of image encoder and encoder settings, that meets or exceed a target value or a target threshold of visual-quality score, and/or that meets or is smaller than a target compression ratio or a target byte-size or a target average BPP value.

Some embodiments may be implemented as, or by using, a stand-alone device or unit, a converter unit, an image converter unit, a video converter unit, a media converter unit, a transcoder, a re-encoder, a decoder-and-encoder unit, or other suitable device. Some embodiments may be utilized as, or by using, a browser extension or add-on or plug-in, or a stand-alone application or "app" or mobile app, or as a native application, or as an application running inside a browser or inside a virtual machine, or as a cloud-computing application or as a cloud-based application; which may receive (or obtain, or download) as input, one or more images or video frames or videos or other media content; and which generates (or uploads, or creates) as output, one or more modified or composite or hybrid files or images or media items or videos.

Some embodiments may be implemented as part of a cloud-computing server or computer, or as part of an image repository or a cloud-computing based repository, or as part of a Content Delivery Network (CDN), or as part of an online repository for that users upload, or as part of an online backup system for images that users capture or create locally via their end-user devices (e.g., smartphone, tablet, digital camera, computer).

Some embodiments may include an image re-encoding unit or an image transcoding unit, configured to receive an input image (e.g., uploaded by a user, or obtained from an end-user device, or obtained from a website or web-server that published content, or obtained from a social network, or the like); and configured to re-encode or to transcode the input image into a resulting compressed image, which may be downscaled or may have the same height and width; wherein the resulting compressed image meets or exceeds at least one of: (i) a visual-quality score threshold, (ii) a compression ratio (or compression efficiency) threshold.

Some embodiments may be implemented as an extension or plug-in or add-on, for a web browser or for an image processing program or for an image editing program; which may enable the end-user to save or to "save as" an image in a compressed version, such that the resulting compressed image meets or exceeds at least one of: (i) a visual-quality score threshold, (ii) a compression ratio (or compression efficiency) threshold.

Some embodiments may be implemented as an extension or plug-in or add-on, for a program or a computer server that runs or that operates a digital social network or an image hosting service; which may enable such system to automatically convert or transcode or re-encode one or more images into a compressed version, such that the resulting compressed image meets or exceeds at least one of: (i) a visual-quality score threshold, (ii) a compression ratio (or compression efficiency) threshold.

In accordance with some embodiments, similar systems and methods may be modified or configured to predict the visual-quality and/or the compression ratio of an Input Video (e.g., a single video frame; or a set or group or batch of video frames; or a video clip or video sequence; rather than a single Input Image), intended to be encoded and/or re-encoded and/or transcoded via a Video Encoder (or video transcoder) selected from a pool of Video Encoders (e.g., H.264 or AVC, or H.265 or HEVC, or AV1, or WebM, or the like), with a set of video encoding settings selected from a pool of Video Encoder Settings; without actually transcoding or re-encoding the input video into a plurality of encoded versions; and while meeting or exceeding a target visual-quality score and/or a target compression efficiency score (or maximum byte-size limit). For example, a single frame may be extracted from the input video; or a set of several (e.g., non-consecutive) frames may be extracted from the input video; or a combination of frames and differential frames (frames from which the sample values of the preceding frame have been subtracted, on a sample by sample basis); and such frame or frames, or combination of frames and differential frames, may be fed as input images to the CNN Engine, which may be pre-trained on a training dataset of video frames that had been re-encoded with various video codecs and various video encoding parameters. The CNN Engine may predict which particular video codec/encoder should be used, and/or which particular video encoding settings should be used, in order to achieve (for a given input video) a resulting/re-encoded/transcoded video that meets or exceeds a target visual-quality metric and/or that meets or exceed a compression ratio or compression efficiency metric and/or that does not exceed a maximum target byte-size or other size metric. In some embodiments, the prediction and adjustment are performed within the video encoder, by modifying the video encoding settings; such that for each frame of the video sequence, the method performs (on a per-frame basis) the prediction of quality per set of encoder settings, the calculation of the encoder parameters, and the actual frame encoding; and then repeating the process for the next frame and then the following frames in the video sequence. Other methods may be used to apply the solutions that were described above with regard to a single Input Image, to a video frame or to a video sequence.

In accordance with some embodiments, similar systems and methods may be modified or configured to predict the audible-quality and/or the compression ratio of an Input Audio Clip or segment (rather than an Input Image), that can be encoded or re-encoded or transcoded via an Audio Encoder selected from a pool of Audio Encoders (e.g., AAC or AC3 or MP3 or Vorbis, or the like), with a set of audio encoding settings selected from a pool of Audio Encoder Settings; without actually transcoding or re-encoding the input audio into a plurality of interim encoded audio versions; and while meeting or exceeding a target audio/audible/perceptual quality score and/or a target compression efficiency score (or maximum byte-size limit). For example, a single one-second audio sample may be extracted from the input audio clip; or a set of several (e.g., non-consecutive) such samples may be extracted from the input audio clip; and such audio sample or samples may be fed as input to the CNN Engine, which may be pre-trained on a training dataset of audio samples that had been re-encoded with various audio codecs and various audio encoding parameters. The CNN Engine may predict which particular audio codec/encoder should be used, and/or which particular audio encoding settings should be used, in order to achieve (for a given input audio) a resulting/re-encoded/transcoded audio that meets or exceeds a target audio quality metric and/or that meets or exceed a compression ratio or compression efficiency metric and/or that does not exceed a maximum target byte-size or other size metric.

Some embodiments provide a system comprising: one or more hardware processors that are configured to execute code, operably associated with one or more memory units that are configured to store code and data. The one or more hardware processors are configured to perform a computerized process comprising: (a) receiving an input image intended for compression; (b) applying a pre-trained Convolutional Neural Network (CNN) Engine to predict what would be (i) compression ratio values and (ii) visual-quality score values, for a resulting image that would be encoded or transcoded from said input image, if said input image would be compressed via a particular Image Encoder from a pool of available Image Encoders by using a particular Encoder Settings from a pool of Image Encoder Settings; (c) based on CNN-based predictions generated by the pre-trained CNN Engine, selecting a single combination of Image Encoder with Encoder Setting, and performing a single compression of said input image using said single combination of Image Encoder with Encoder Setting to generate an optimally compressed image.

In some embodiments, said pre-trained CNN Engine and said system are configured to generate said predictions of (i) compression ratio values and (ii) visual-quality score values, without actually performing any compression or any encoding or any transcoding of said input image.

In some embodiments, said pre-trained CNN Engine and said system are configured to generate said predictions of (i) compression ratio values and (ii) visual-quality score values, without actually performing any compression or any encoding or any transcoding of said input image, by utilizing said CNN Engine that was pre-trained on a dataset that includes at least: (A) a plurality of training images, (B) data-points indicating actual compression ratio and actual visual-quality score for each of the training images when actually compressed by using a particular image encoder having a particular encoder setting.

In some embodiments, the Image Encoder, that is selected based on predictions by the pre-trained CNN Engine, generates said optimally compressed image in a single compression iteration applied to the input image, in a non-iterative process, without generating a plurality of interim compressed versions of the input image, and without selecting one out of multiple interim compressed versions of the input image.

In some embodiments, a particular combination of the Image Encoder and the Encoder Settings, that is selected based on predictions by the pre-trained CNN Engine, is selected by choosing a combination that is predicted to yield a Visual-Quality Score value that meets or exceeds a threshold Visual-Quality Score that was pre-defined for said input image.

In some embodiments, said particular combination of the Image Encoder and the Encoder Settings, that is selected based on predictions by the pre-trained CNN Engine, is predicted to yield a best obtainable Compression Ratio value for said input image, and is also predicted to yield a Visual-Quality Score value that meets or exceeds a threshold Visual-Quality Score that was pre-defined for said input image.

In some embodiments, the pool of Image Encoder comprises at least two different Image Encoders that utilize two different image encoding schemes.

In some embodiments, the pool of Image Encoder comprises at least: a first Image Encoder that is configured to apply a particular image encoding scheme using a first set of image encoding coefficients; a second Image Encoder that is configured to apply said particular image encoding scheme but using a second, different, set of image encoding coefficients.

In some embodiments, the pre-trained CNN Engine is trained on a dataset comprising: a plurality of high-quality images, wherein each high-quality image is pre-tested and is found to meet or exceed a minimum threshold of Visual-Quality Score.

In some embodiments, the dataset, on which the CNN Engine is trained, comprises: a plurality of downscaled versions of each of said high-quality images.

In some embodiments, the dataset, on which the CNN Engine is trained, comprises: a plurality of downscaled versions of each of said high-quality images; and each downscaled version of each of said high-quality images is encoded into a plurality of compressed versions, wherein each compressed version is encoded by using a combination of (i) an Image Encoder from said pool of Image Encoders and (ii) an Encoder Setting from said pool of Encoder Settings.

In some embodiments, the CNN Engine comprises: a feature extractor, to extract multi-scale feature maps from said dataset; and a feature enriching unit, to enrich said feature maps using a Feature Pyramid Network.

In some embodiments, the CNN Engine further comprises: a statistics generator, to reduce said feature maps to mean values and maximum values; and a vectors generator, to generate a plurality of vectors for multiscale image representations.

In some embodiments, the CNN Engine further comprises: a vectors concatenation unit, to generate a single concatenated vector from said plurality of vectors for each multiscale image representation; a global processing unit, to process each single concatenated vector by multiple linear layers of the CNN engine, and to capture a cross-vector pattern or a cross-vector relationship, and to generate a modified concatenated vector from each single concatenated vector.

In some embodiments, the CNN Engine further comprises: a predictors generator, to generate a prediction of Visual-Quality Score and a prediction of Compression Ratio, based on a plurality of modified concatenated vector generated by the CNN Engine.

In some embodiments, the system receives as input: said input image, and a target Visual-Quality Score for a resulting compressed image; wherein the system is configured to utilize said CNN Engine to generate as output: the resulting compressed image that has at least said Visual-Quality Score and that has a smallest possible byte-size.

In some embodiments, the system receives as input: said input image, and a target Visual-Quality Score for a resulting compressed image; wherein the system is configured to utilize said CNN Engine to generate as output: the resulting compressed image that has at least said Visual-Quality Score and that has a smallest possible value of average Bits Per Pixel.

In some embodiments, the system receives as input: said input image, and a target byte-size for a resulting compressed image; wherein the system is configured to utilize said CNN Engine to generate as output: the resulting compressed image that has a byte-size that is equal to or smaller than said target byte-size, and that has a highest possible Visual-Quality Score for the byte-size of the resulting compressed image.

In some embodiments, the system receives as input: said input image, and a target average Bits Per Pixel (BPP) value for a resulting compressed image; wherein the system is configured to utilize said CNN Engine to generate as output: the resulting compressed image that has an average BPP value that is equal to or smaller than said target average BPP value, and that has a highest possible Visual-Quality Score for the byte-size of the resulting compressed image.

In some embodiments, the system receives as input: (I) said input image, and (II) a target resulting size, indicated as a target maximum byte-size; and (III) a target minimum Visual-Quality Score (VQS); wherein the system is configured to utilize said CNN Engine to generate as output: the resulting compressed image that has byte-size that is equal to or smaller than said target resulting size, and that has a highest possible Visual-Quality Score for the byte-size of the resulting compressed image.

In some embodiments, the system receives as input: (I) said input image, and (II) a target resulting size, indicated as a target maximum Bits Per Pixel (BPP) value; and (III) a target minimum Visual-Quality Score (VQS); wherein the system is configured to utilize said CNN Engine to generate as output: the resulting compressed image that has a BPP value that is equal to or smaller than said target maximum BPP value, and that has a highest possible Visual-Quality Score for the BPP value of the resulting compressed image.

In some embodiments, the CNN Engine is specifically configured or fine-tuned to predict which particular chroma sub-sampling methods, out of a plurality of available chroma sub-sampling methods, would yield a resulting compressed image having a smallest byte-size, from said input image.

Some embodiments include a non-transitory storage medium or storage article having stored thereon instructions that, when executed by a machine or a hardware processor, cause the machine or the hardware processor to perform a method as described.

Some embodiments include a system comprising: one or more hardware processors, that are configured to execute code, and that are operably associated with one or more memory units that are configured to store code; wherein the one or more hardware processors are configured to perform a method as described.

In some embodiments, in order to perform the computerized operations described above, the relevant system or devices may be equipped with suitable hardware components and/or software components; for example: a processor able to process data and/or execute code or machine-readable instructions (e.g., a central processing unit (CPU), a graphic processing unit (GPU), a digital signal processor (DSP), a processing core, an Integrated Circuit (IC), an Application-Specific IC (ASIC), one or more controllers, a logic unit, or the like); a memory unit able to store data for short term (e.g., Random Access Memory (RAM), volatile memory); a storage unit able to store data for long term (e.g., non-volatile memory, Flash memory, hard disk drive, solid state drive, optical drive); an input unit able to receive user's input (e.g., keyboard, keypad, mouse, touch-pad, touch-screen, trackball, microphone); an output unit able to generate or produce or provide output (e.g., screen, touch-screen, monitor, display unit, audio speakers); one or more transceivers or transmitters or receivers or communication units (e.g., Wi-Fi transceiver, cellular transceiver, Bluetooth transceiver, wireless communication transceiver, wired transceiver, Network Interface Card (NIC), modem); and other suitable components (e.g., a power source, an Operating System (OS), drivers, one or more applications or "apps" or software modules, or the like).

In accordance with embodiments, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Although portions of the discussion herein relate, for demonstrative purposes, to wired links and/or wired communications, some embodiments are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL), BASIC, Visual BASIC, MATLAB, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a legend list or a database of possible values or ranges; a comparison or matching or searching process which searches for matches and/or identical results and/or similar results among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wide Area Network (WAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

Functions, operations, components and/or features described herein with reference to one or more embodiments, may be combined with, or may be utilized in combination with, one or more other functions, operations, components and/or features described herein with reference to one or more other embodiments of the present invention. The present invention may thus comprise any possible or suitable combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. A system comprising:
one or more hardware processors that are configured to execute code,
operably associated with one or more memory units that are configured to store code and data,
wherein the one or more hardware processors are configured to perform a computerized process comprising:
(a) receiving an input image intended for compression;
(b) applying a pre-trained Convolutional Neural Network (CNN) Engine to predict what would be (i) compression ratio values and (ii) visual-quality score values, for a resulting compressed image that would be encoded or transcoded from said input image, if said input image would be compressed via a particular Image Encoder from a pool of available Image Encoders by using a particular Encoder Settings from a pool of Image Encoder Settings;
(c) based on CNN-based predictions generated by the pre-trained CNN Engine, selecting a single combination of Image Encoder with Encoder Setting, and performing a single compression of said input image using said single combination of Image Encoder with Encoder Setting to generate an optimally compressed image.

2. The system of claim 1,
wherein said pre-trained CNN Engine and said system generate said predictions of (i) compression ratio values and (ii) visual-quality score values, without actually performing any compression or any encoding or any transcoding of said input image.

3. The system of claim 1,
wherein said pre-trained CNN Engine and said system generate said predictions of (i) compression ratio values and (ii) visual-quality score values, without actually performing any compression or any encoding or any transcoding of said input image,
by utilizing said CNN Engine that was pre-trained on a dataset that includes at least: (A) a plurality of training images, (B) data-points indicating actual compression ratio and actual visual-quality score for each of the training images when actually compressed by using a particular image encoder having a particular encoder setting.

4. The system of claim 3,
wherein the Image Encoder, that is selected based on predictions by the pre-trained CNN Engine, generates said optimally compressed image in a single compression iteration applied to the input image,
in a non-iterative process,
without generating a plurality of interim compressed versions of the input image, and without selecting one out of multiple interim compressed versions of the input image.

5. The system of claim 4,
wherein a particular combination of the Image Encoder and the Encoder Settings, that is selected based on predictions by the pre-trained CNN Engine, is selected by choosing a combination that is predicted to yield a Visual-Quality Score value that meets or exceeds a threshold Visual-Quality Score that was pre-defined for said input image.

6. The system of claim 5,
wherein said particular combination of the Image Encoder and the Encoder Settings, that is selected based on predictions by the pre-trained CNN Engine, is predicted to yield a best obtainable Compression Ratio value for said input image, and is also predicted to yield a Visual-Quality Score value that meets or exceeds a threshold Visual-Quality Score that was pre-defined for said input image.

7. The system of claim 1,
wherein the pool of Image Encoder comprises at least two different Image Encoders that utilize two different image encoding schemes.

8. The system of claim 1,
wherein the pool of Image Encoder comprises at least:
a first Image Encoder that is configured to apply a particular image encoding scheme using a first set of image encoding coefficients;
a second Image Encoder that is configured to apply said particular image encoding scheme but using a second, different, set of image encoding coefficients.

9. The system of claim 1,
wherein the pre-trained CNN Engine is trained on a dataset comprising:
a plurality of high-quality images,
wherein each high-quality image is pre-tested and is found to meet or exceed a minimum threshold of Visual-Quality Score.

10. The system of claim 9,
wherein the dataset, on which the CNN Engine is trained, comprises:
a plurality of downscaled versions of each of said high-quality images.

11. The system of claim 9,
wherein the dataset, on which the CNN Engine is trained, comprises:
a plurality of downscaled versions of each of said high-quality images,
wherein each downscaled version of each of said high-quality images is encoded into a plurality of compressed versions, wherein each compressed version is encoded by using a combination of (i) an Image Encoder from said pool of Image Encoders and (ii) an Encoder Setting from said pool of Encoder Settings.

12. The system of claim 11,
wherein the CNN Engine comprises:
a feature extractor, to extract multi-scale feature maps from said dataset;
a feature enriching unit, to enrich said feature maps using a Feature Pyramid Network.

13. The system of claim 12,
wherein the CNN Engine further comprises:
a statistics generator, to reduce said feature maps to mean values and maximum values;
a vectors generator, to generate a plurality of vectors for multiscale image representations.

14. The system of claim 13,
wherein the CNN Engine further comprises:
a vectors concatenation unit, to generate a single concatenated vector from said plurality of vectors for each multiscale image representation;
a global processing unit, to process each single concatenated vector by multiple linear layers of the CNN engine, and to capture a cross-vector pattern or a cross-vector relationship, and to generate a modified concatenated vector from each single concatenated vector.

15. The system of claim 14,
wherein the CNN Engine further comprises:
a predictors generator, to generate a prediction of Visual-Quality Score and a prediction of Compression Ratio, based on a plurality of modified concatenated vector generated by the CNN Engine.

16. The system of claim 1,
wherein the system receives as input: said input image, and a target Visual-Quality Score for a resulting compressed image;
wherein the system is configured to utilize said CNN Engine to generate as output: the resulting compressed image that has at least said Visual-Quality Score and that has a smallest possible byte-size.

17. The system of claim 1,
wherein the system receives as input: said input image, and a target Visual-Quality Score for a resulting compressed image;
wherein the system is configured to utilize said CNN Engine to generate as output: the resulting compressed image that has at least said Visual-Quality Score and that has a smallest possible value of average Bits Per Pixel.

18. The system of claim 1,
wherein the system receives as input: said input image, and a target byte-size for a resulting compressed image;
wherein the system is configured to utilize said CNN Engine to generate as output: the resulting compressed image that has a byte-size that is equal to or smaller than said target byte-size, and that has a highest possible Visual-Quality Score for the byte-size of the resulting compressed image.

19. The system of claim 1,
wherein the system receives as input: said input image, and a target average Bits Per Pixel (BPP) value for a resulting compressed image;
wherein the system is configured to utilize said CNN Engine to generate as output: the resulting compressed image that has an average BPP value that is equal to or smaller than said target average BPP value, and that has a highest possible Visual-Quality Score for the byte-size of the resulting compressed image.

20. The system of claim 1,
wherein the system receives as input:
(I) said input image, and
(II) a target resulting size, indicated as a target maximum byte-size, and
(III) a target minimum Visual-Quality Score (VQS);
wherein the system is configured to utilize said CNN Engine to generate as output: the resulting compressed image that has byte-size that is equal to or smaller than said target resulting size, and that has a highest possible Visual-Quality Score for the byte-size of the resulting compressed image.

21. The system of claim 1,
wherein the system receives as input:
(I) said input image, and
(II) a target resulting size, indicated as a target maximum Bits Per Pixel (BPP) value, and
(III) a target minimum Visual-Quality Score (VQS);
wherein the system is configured to utilize said CNN Engine to generate as output: the resulting compressed image that has a BPP value that is equal to or smaller than said target maximum BPP value, and that has a highest possible Visual-Quality Score for the BPP value of the resulting compressed image.

22. The system of claim 1,
wherein the CNN Engine is specifically configured or fine-tuned to predict which particular chroma sub-sampling methods, out of a plurality of available chroma sub-sampling methods, would yield a resulting compressed image having a smallest byte-size, from said input image.

23. A computerized method comprising:

(a) receiving an input image intended for compression;

(b) applying a pre-trained Convolutional Neural Network (CNN) Engine to predict what would be (i) compression ratio values and (ii) visual-quality score values, for a resulting compressed image that would be encoded or transcoded from said input image, if said input image would be compressed via a particular Image Encoder from a pool of available Image Encoders by using a particular Encoder Settings from a pool of Image Encoder Settings;

(c) based on CNN-based predictions generated by the pre-trained CNN Engine, selecting a single combination of Image Encoder with Encoder Setting, and performing a single compression of said input image using said single combination of Image Encoder with Encoder Setting to generate an optimally compressed image;

wherein said computerized method is implementable by utilizing at least a hardware processor.

24. A non-transitory storage medium having stored thereon instructions that, when executed by a hardware processor, cause the hardware processor to perform a method comprising:

(a) receiving an input image intended for compression;

(b) applying a pre-trained Convolutional Neural Network (CNN) Engine to predict what would be (i) compression ratio values and (ii) visual-quality score values, for a resulting compressed image that would be encoded or transcoded from said input image, if said input image would be compressed via a particular Image Encoder from a pool of available Image Encoders by using a particular Encoder Settings from a pool of Image Encoder Settings;

(c) based on CNN-based predictions generated by the pre-trained CNN Engine, selecting a single combination of Image Encoder with Encoder Setting, and performing a single compression of said input image using said single combination of Image Encoder with Encoder Setting to generate an optimally compressed image.

* * * * *